United States Patent
Suzuki (10) Patent No.: US 12,247,624 B2
(45) Date of Patent: Mar. 11, 2025

(54) FOLLOWER BEARING

(71) Applicant: NIPPON THOMPSON CO., LTD., Tokyo (JP)

(72) Inventor: Jinya Suzuki, Mino (JP)

(73) Assignee: NIPPON THOMPSON CO., LTD., Tokyo (JP)

(*) Notice: Subject to any disclaimer, the term of this patent is extended or adjusted under 35 U.S.C. 154(b) by 183 days.

(21) Appl. No.: 17/906,757

(22) PCT Filed: Mar. 9, 2021

(86) PCT No.: PCT/JP2021/009249
§ 371 (c)(1),
(2) Date: Sep. 20, 2022

(87) PCT Pub. No.: WO2021/193012
PCT Pub. Date: Sep. 30, 2021

(65) Prior Publication Data
US 2023/0167856 A1    Jun. 1, 2023

(30) Foreign Application Priority Data
Mar. 24, 2020 (JP) .............................. 2020-052971

(51) Int. Cl.
*F16C 43/04*    (2006.01)
*F16C 19/46*    (2006.01)
(Continued)

(52) U.S. Cl.
CPC ........ *F16C 43/045* (2013.01); *F16C 33/7816* (2013.01); *F16C 33/7889* (2013.01);
(Continued)

(58) Field of Classification Search
CPC .. F16C 19/46; F16C 33/6677; F16C 33/7816; F16C 33/7889; F16C 43/045; F16H 53/06
See application file for complete search history.

(56) References Cited

U.S. PATENT DOCUMENTS 3,596,533 A * 8/1971 Nightingale ............ F16C 21/00
                                                    384/127
4,113,327 A * 9/1978 Koch .................... F16C 13/006
                                                    384/485
(Continued)

FOREIGN PATENT DOCUMENTS

EP    1217236 A2    6/2002
GB    2061415 A     5/1981
(Continued)

OTHER PUBLICATIONS

Supplementary European Search Report for corresponding European Appln. No. EP21776411 dated Dec. 8, 2023.

*Primary Examiner* — James Pilkington
(74) *Attorney, Agent, or Firm* — Oliff PLC (57) ABSTRACT

A follower bearing 1 includes: an inner member 10 including a first body 50 and a flange 52; an outer ring 20; a plurality of rolling elements 40; and a first sealing member 30A including an annular first portion disposed between an outer peripheral surface 52A of the flange 52 and a first surface 22A and at least partially forming a sealing structure between the first portion and the outer ring 20. The first portion has an outer diameter that gradually increases toward a first end surface 52B at an end opposite to a first rolling surface 51A of the flange 52 in an axial direction.

18 Claims, 9 Drawing Sheets

(51) Int. Cl.
  *F16C 33/66* (2006.01)
  *F16C 33/78* (2006.01)
  *F16H 53/06* (2006.01)

(52) U.S. Cl.
  CPC .............. *F16H 53/06* (2013.01); *F16C 19/46* (2013.01); *F16C 33/6677* (2013.01)

(56) References Cited

U.S. PATENT DOCUMENTS

| | | | |
|---|---|---|---|
| 5,833,245 A | 11/1998 | Gallagher | |
| 6,056,444 A * | 5/2000 | Ogawa | F16C 33/102 |
| | | | 184/105.3 |
| 6,443,460 B2 * | 9/2002 | Weiss | F16C 13/006 |
| | | | 384/485 |
| 8,596,870 B2 * | 12/2013 | Akita | F16J 15/166 |
| | | | 384/140 |
| 2002/0070504 A1 | 6/2002 | Neubert et al. | |
| 2015/0013420 A1 | 1/2015 | Shibutani et al. | |

FOREIGN PATENT DOCUMENTS

| | | |
|---|---|---|
| JP | 2001208086 A | 8/2001 |
| JP | 2001295849 A | 10/2001 |
| JP | 2011033142 A | 2/2011 |

\* cited by examiner

FIG.10

FOLLOWER BEARING

TECHNICAL FIELD

The present disclosure relates to a follower bearing.

This application claims priority to Japanese Patent Application No. 2020-052971, which was filed on Mar. 24, 2020, and is incorporated herein by reference in its entirety.

BACKGROUND ART

In a known follower bearing, an outer ring rotates while being in contact with another member (see, for example, Patent Document 1). Patent Document 1 discloses a follower bearing including an inner member having a first rolling surface, an outer ring having a second rolling surface opposite to the first rolling surface, a plurality of rolling elements disposed to be roll able on the first rolling surface and the second rolling surface, and a sealing member disposed between the inner member and the outer ring. The inner member of the follower bearing has an annular flange.

CITATION LIST

Patent Literature

Patent Document 1: Japanese Patent Application Publication No. 2011-33142

SUMMARY OF INVENTION

Technical Problem

The follower bearing disclosed in Patent Document 1 is assembled by inserting the inner member into the outer ring with the sealing member being placed on the flange of the inner member. The sealing member forms a sealing structure between the sealing member and the outer ring. In the sealing structure, a gap is formed between the outer ring and the sealing member or the outer ring is in contact with the sealing member in order to reduce leakage of grease from the inside of the follower bearing and mixture of foreign substance in the sealing structure. In the follower bearing of Patent Document 1, the outer ring might be caught by the sealing member in inserting the inner member into the outer ring, and it is difficult to place the outer ring in assembly. It is therefore an object of the present disclosure to provide a follower bearing that can be easily assembled.

Solution to Problems

A follower bearing according to the present disclosure includes: an inner member including a first body and a flange, the first body having a rod shape and having an annular first rolling surface in an outer peripheral surface of the first body, the flange having a disk annular shape, disposed on the outer peripheral surface at one end of the first body, having a center axis coaxial with the first body, and having a diameter larger than a diameter of the first body; an outer ring having an annular first surface and an annular second rolling surface, the first surface facing an outer peripheral surface of the flange, the second rolling surface facing the first rolling surface; a plurality of rolling elements disposed to be rollable on the first rolling surface and the second rolling surface; and a first sealing member including an annular first portion, the first portion being disposed between the outer peripheral surface of the flange and the first surface and at least partially forming a sealing structure between the first portion and the outer ring, the first portion having an outer diameter that gradually increases toward a first end surface, the first end surface being at an end of the flange opposite to the first rolling surface in an axial direction.

Advantages of Invention

The follower bearing described above can be easily assembled.

DESCRIPTION OF EMBODIMENTS

Summary of Embodiment

First, an embodiment of the present disclosure will be listed and described. A follower bearing according to the present disclosure includes: an inner member including a first body and a flange, the first body having a rod shape and having an annular first rolling surface in an outer peripheral surface of the first body, the flange having a disk annular shape, disposed on the outer peripheral surface at one end of the first body, having a center axis coaxial with the first body, and having a diameter larger than a diameter of the first body; an outer ring having an annular first surface and an annular second rolling surface, the first surface facing an outer peripheral surface of the flange, the second rolling surface facing the first rolling surface; a plurality of rolling elements disposed to be rollable on the first rolling surface and the second rolling surface; and a first sealing member including an annular first portion. The first portion is disposed between the outer peripheral surface of the flange and the first surface and at least partially forming a sealing structure between the first portion and the outer ring, the first portion has an outer diameter that gradually increases toward a first end surface, and the first end surface is at an end of the flange opposite to the first rolling surface in an axial direction.

The follower bearing according to the present disclosure includes a first sealing member. The first sealing member includes the annular first portion disposed between the outer peripheral surface of the flange and the first surface and partially forming the sealing structure between the first portion and the outer ring. The first portion has an outer diameter that gradually increases toward the first end surface. The follower bearing is assembled by inserting the inner member including the flange provided with the first sealing member in the inner member. Since the first sealing member includes the first portion, in inserting the inner member in the outer ring, the outer ring is guided by the first portion, and the outer ring is less likely to get stuck on the first sealing member. Thus, with the configuration of the follower bearing according to the present disclosure, the follower bearing 1 can be easily assembled.

In the follower bearing described above, the first portion may have a tapered shape whose outer diameter gradually increases toward the first end surface. With this configuration, in inserting the inner member in the outer ring, the outer ring is more reliably guided by the first portion, and is less likely to get stuck on the first sealing member. Thus, with the configuration of the follower bearing according to the present disclosure, the follower bearing can be more easily assembled.

In the follower bearing, the diameter of the second rolling surface may be smaller than the diameter of the first surface. The outer ring may further include, in the inner peripheral surface, an annular second surface connecting the second rolling surface and the first surface to each other and facing a second end surface at an end opposite to the first end surface of the flange in the axial direction. The first sealing member may further include an annular second portion connected to the first portion and disposed between the second end surface and the second surface. Since the first sealing member includes the second portion, when an axial load is applied to the follower bearing, contact between the second end surface of the flange and the second surface can be suppressed. Thus, it is possible to suppress occurrence of, for example, wearing caused by contact between the second end surface of the flange and the second surface of the outer ring.

In the follower bearing, the second end surface of the flange may have a maximum height roughness Rz of 12.5 µm or less. With this configuration, when an axial load is applied to the follower bearing 1, wearing of the first sealing member and the second end surface of the flange can be reduced.

In the follower bearing, the first sealing member may include a first sealing end surface located near the first end surface in the axial direction. An outer diameter of the first sealing end surface may gradually decreases toward the first end surface. With this configuration, even when dust is accumulated on the first sealing end surface, the shape of the first sealing end surface described above facilitates sliding of the dust on the first sealing end surface downward toward the first end surface. Accordingly, dust is less likely to be accumulated on the first sealing end surface. Thus, dust on the first sealing end surface is less likely to enter the inside of the bearing across the outer peripheral surface of the first sealing member so that dustproof performance of the follower bearing can be enhanced.

In the follower bearing, the first sealing end surface may have a tapered shape whose outer diameter gradually decreases toward the first end surface. With this shape, dust accumulated on the first sealing end surface can be more reliably caused to slide down toward the first end surface. Accordingly, dust is much less likely to be accumulated on the first sealing end surface. Thus, dust on the first sealing end surface is less likely to enter the inside of the bearing across the outer peripheral surface of the first sealing member so that dustproof performance of the follower bearing can be enhanced.

In the follower bearing, the first sealing end surface may extend to the first end surface in the axial direction. With this configuration, dust accumulated on the first sealing end surface having the shape described above can smoothly slide down to the first end surface so that dust is less likely to be accumulated in a region between the first sealing end surface and the outer peripheral surface of the flange. Thus, dustproof performance of the follower bearing can be enhanced.

In the follower bearing, the inner member may further include a ring fitted in the first body to contact the outer peripheral surface opposite to the flange and having a center axis coaxial with the first body, when seen from the first rolling surface of the first body. The inner peripheral surface of the outer ring may further have an annular third surface and an annular fourth surface, the third surface may face an outer peripheral surface of the ring and have a diameter larger than a diameter of the second rolling surface, the fourth surface may connect the second rolling surface and the third surface to each other and face a third end surface, and the third end surface may be near the first rolling surface of the ring in the axial direction. The follower hearing may further include an annular third portion and an annular fourth portion, the third portion may be disposed between the outer peripheral surface of the ring and the third surface and at least partially form a sealing structure between the third portion and the outer ring, and the fourth portion may be connected to the third portion and disposed between the third end surface and the fourth surface. The third portion may have an outer diameter that gradually increases toward a fourth end surface, and the fourth end surface may be at an end opposite to the third end surface of the ring in the axial direction.

The ring provided with the second sealing member is attached to the first body with the first body being inserted in the outer ring. Since the second sealing member includes the third portion, in attaching the ring provided with the second sealing member to the first body, the ring is guided by the outer peripheral surface of the third portion so that the second sealing member is less likely to get stuck on the outer ring. Accordingly, the ring provided with the second sealing member can be easily attached to the first body. In addition, since the second sealing member includes the fourth portion, when an axial load is applied to the follower bearing, contact between the third end surface of the ring and the fourth surface can be suppressed. Thus, it is possible to suppress occurrence of, for example, wearing caused by contact between the third end surface of the ring and the fourth surface of the outer ring.

In the follower bearing, the third portion may have a tapered shape whose outer diameter gradually increases toward the fourth end surface. With this configuration, in attaching the ring to the first body, the ring is more reliably guided by the outer peripheral surface of the third portion so that the second sealing member is much less likely to get truck on the outer ring. Thus, with the configuration of the follower bearing according to the present disclosure, the follower bearing can be more easily assembled.

In the follower bearing, the third end surface of the ring may have a maximum height roughness Rz of 12.5 µm or less. With this configuration, when an axial load is applied to the follower bearing, wearing of the second sealing member and the third end surface of the ring can be reduced.

In the follower bearing, the second sealing member may include a second sealing end surface located near the fourth end surface in the axial direction. The second sealing end surface may have an outer diameter that gradually decreases toward the fourth end surface. With this configuration, even when dust is accumulated on the second sealing end surface, the shape of the second sealing end surface described above facilitates sliding of the dust on the second sealing end surface downward toward the fourth end surface. Accordingly, dust is less likely to be accumulated on the second sealing end surface. Thus, dust on the second sealing end surface is less likely to enter the inside of the bearing across the outer peripheral surface of the second sealing member so that dustproof performance of the follower bearing can be enhanced.

In the follower bearing described above, the second sealing end surface may have a tapered shape whose outer diameter gradually decreases toward the fourth end surface. With this shape, dust accumulated on the second sealing end surface can be more reliably caused to slide down toward the fourth end surface. Accordingly, dust is much less likely to be accumulated on the second sealing end surface. Thus, dust on the second sealing end surface is less likely to enter the inside of the bearing across the outer peripheral surface of the second sealing member so that dustproof performance of the follower bearing can be enhanced.

In the follower bearing described above, the second sealing end surface may extend to the fourth end surface in the axial direction. Accordingly, dust accumulated on the second sealing end surface having the shape described above can smoothly slide down to the fourth end surface so that dust is less likely to be accumulated in a region between the second sealing end surface and the outer peripheral surface of the ring. Thus, dustproof performance of the follower bearing can be enhanced.

In the follower bearing, a material constituting the second sealing member may be at least a resin selected from the group consisting of polyether ether ketone, polyacetal, and polyamide. The resins are preferable as materials constituting the second sealing member.

In the follower bearing, a material constituting the first sealing member may be at least a resin selected from the group consisting of polyether ether ketone, polyacetal, and polyamide. The resins are preferable as materials constituting the first sealing member.

In the follower bearing, the rolling element may be a roller. With this configuration, a sufficient withstand load can be easily achieved while the height of the follower bearing in a cross section is reduced.

Specific Examples of Embodiment

A specific example of an embodiment of a follower bearing according to the present disclosure will now be described with reference to the drawings. In the following drawings, the same or corresponding parts are denoted by the same reference numerals, and the description thereof will not be repeated.

Figure 1:
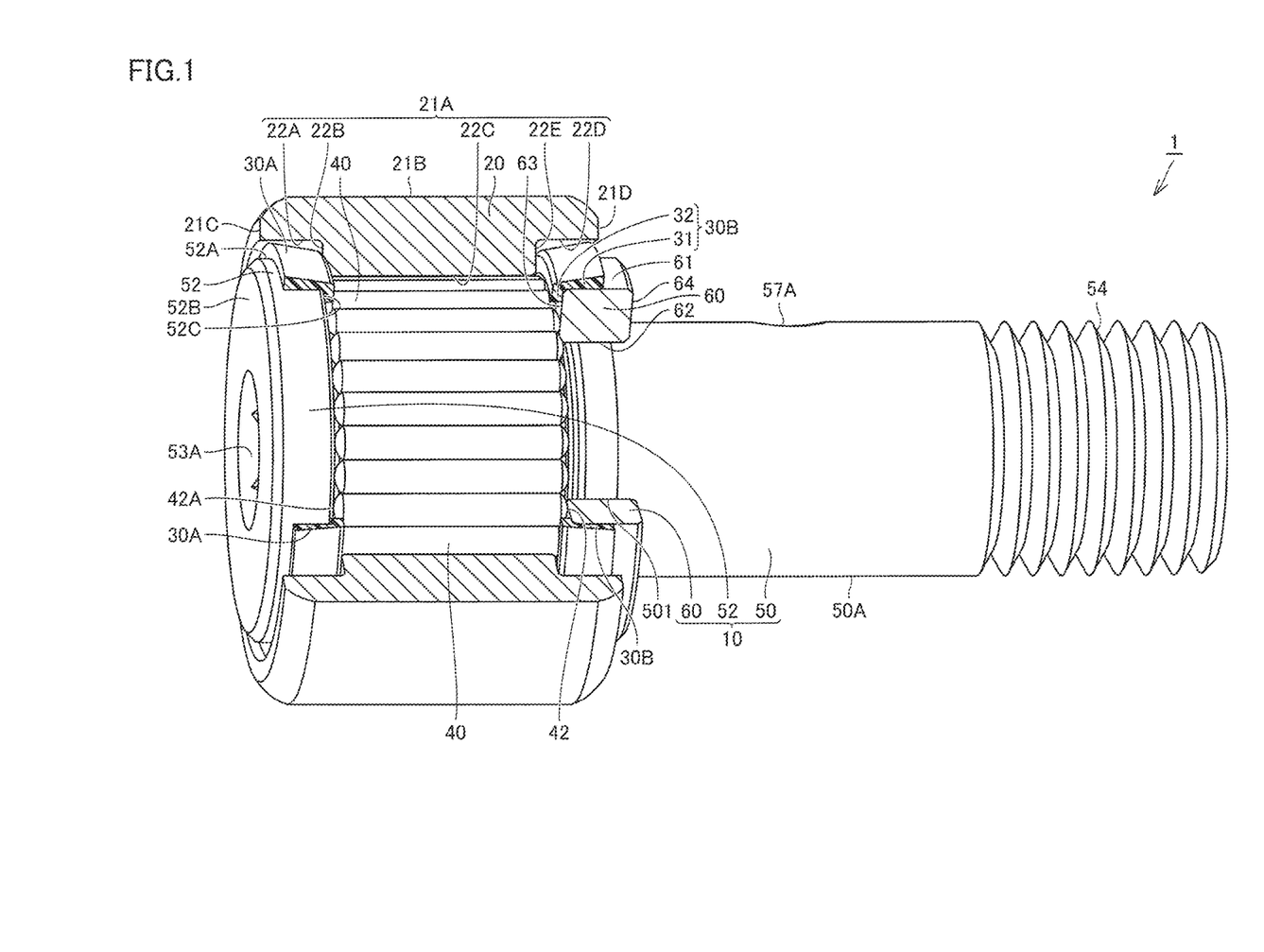
FIG. 1 is a perspective view schematically illustrating a structure of a follower bearing.
Figure 2:
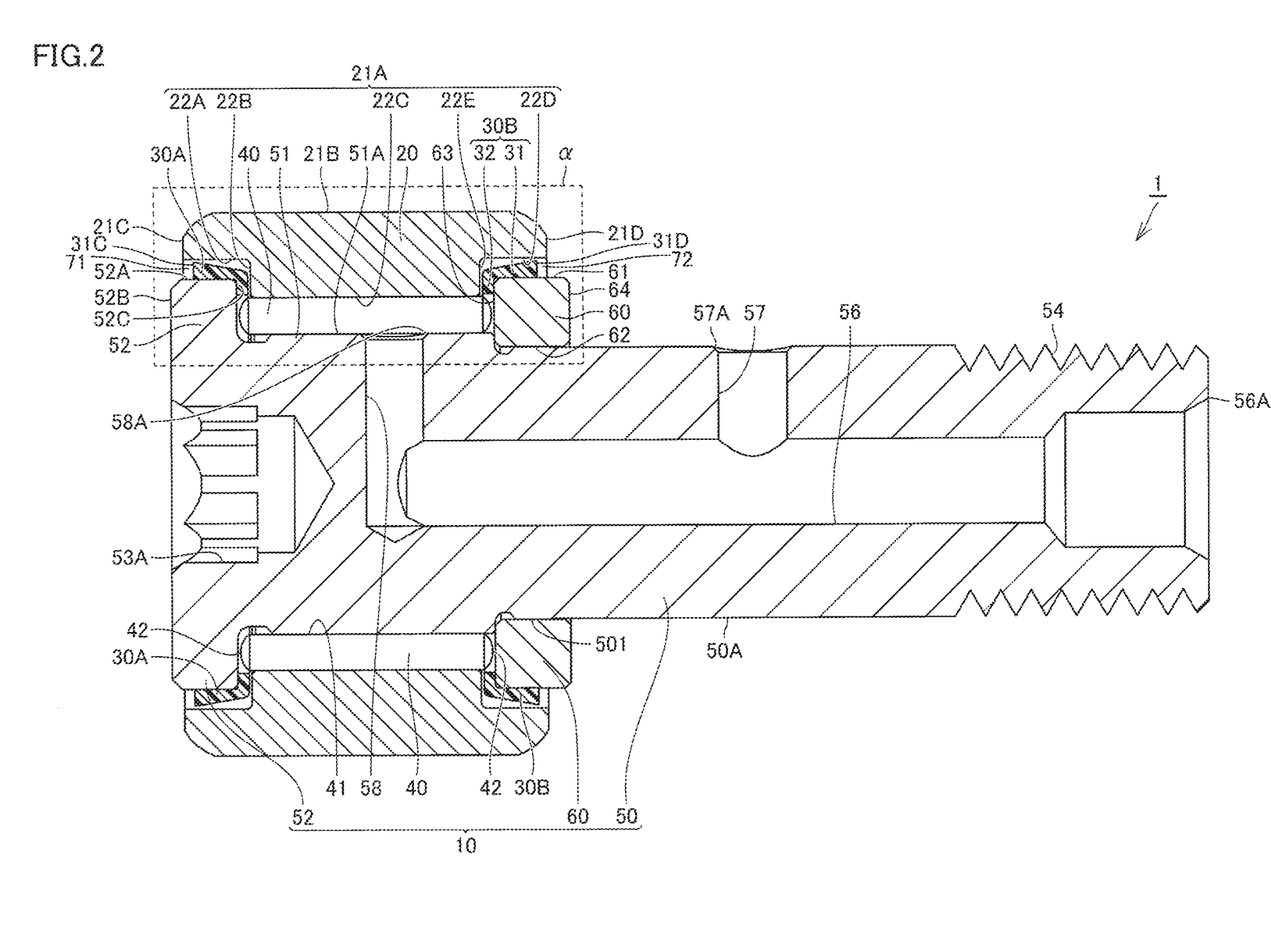
FIG. 2 is a cross-sectional view schematically illustrating the structure of the follower bearing.
Figure 3:
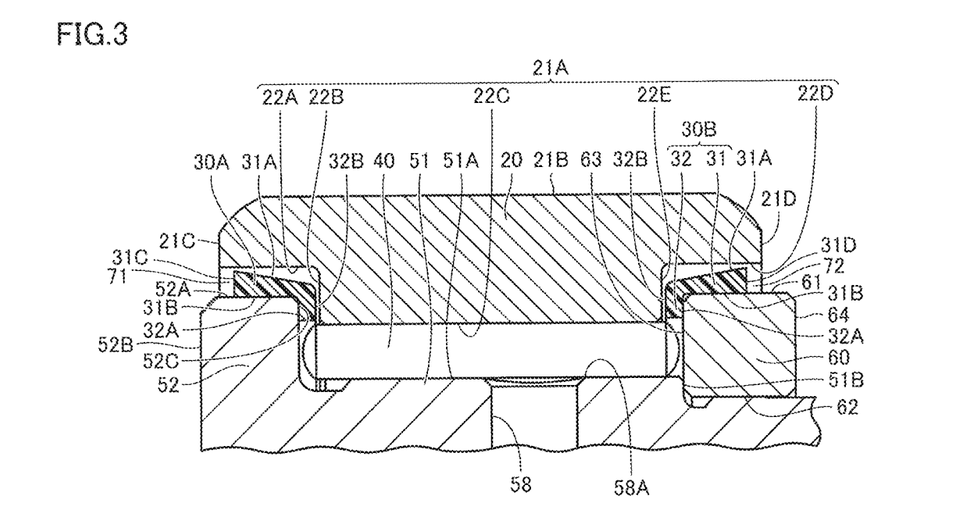
FIG. 3 is a cross-sectional view schematically illustrating the structure of the follower bearing.

FIG. 1 is a perspective view schematically illustrating a structure of a follower bearing according to one embodiment of the present disclosure. FIG. 1 illustrates a state where some parts are partially cut out in order to show an internal structure. In FIG. 1, a hatched region corresponds to a cross section. FIG. 2 is a cross-sectional view schematically illustrating the structure of the follower bearing. FIG. 2 shows a cross section including a rotation axis of the follower bearing. FIG. 3 is an enlarged schematic cross-sectional view of a region α in FIG. 2.

With reference to FIGS. 1 through 3, a follower bearing 1 according to this embodiment includes an inner member 10, an outer ring 20, a first sealing member 30A, a second sealing member 30B, and a plurality of rollers 40 as rolling elements. In this embodiment, the follower bearing 1 is a full roller bearing including no cages of the rollers 40. The inner member 10 includes a first body 50, a flange 52 disposed on an outer peripheral surface of the first body 50 at one end, and a ring 60. The inner member 10 is made of steel. The first body 50 has a rod shape (solid cylindrical shape).

A hexagonal hole 53A having a regular hexagonal prism shape is formed at one end of the first body 50 and includes a region intersecting with (orthogonal to in this embodiment) the center axis of the first body 50. A screw portion 54 having a helical thread groove is disposed on the outer peripheral surface of the first body 50 at the other end. With this configuration, in placing the follower bearing 1, the screw portion 54 is screwed into a threaded hole (not shown) formed in a retention member retaining the follower bearing 1, for example, and the front end of a hexagonal wrench is inserted in the hexagonal hole 53A and fastened, or the inner member 10 is inserted through a housing hole and a nut is screwed onto the screw portion 54, thereby fixing the follower bearing 1 to the retention member.

The first body 50 has a lame diameter portion 51 whose diameter is slightly lamer than that of the other region. The large diameter portion 51 is disposed closer to the flange 52 than the center in the axial direction. The large diameter portion 51 is disposed between the flange 52 described later and the screw portion 54 in the axial direction. The outer peripheral surface of the large diameter portion 51 includes a first rolling surface 51A having a cylindrical shape. That is, the first body 50 includes the annular first rolling surface 51A in the outer peripheral surface 50A.

The first body 50 has an opening 56A at the side opposite to the flange 52 in the axial direction, and has a first hole 56 extending along the axial direction. The first body 50 has an opening 57A in the outer peripheral surface 50A of the first body 50, and has a second hole 57 extending along the radial direction. The second hole 57 communicates with the first hole 56. The first body 50 has an opening 58A in the first rolling surface 51A of the large diameter portion 51, and has a third hole 58 extending along the radial direction. The third hole 58 communicates with the first hole 56. The first body 50 is disposed between the large diameter portion 51 and the screw portion 54 in the axial direction, and has an annular projection 501 having a diameter smaller than that of the large diameter portion 51.

The flange 52 has a disk annular shape whose diameter is larger than that of the first body 50. The flange 52 has a center axis coaxial with the first body 50. The diameter of the large diameter portion 51 is smaller than that of the flange 52. The flange 52 includes an outer peripheral surface 52A, a first end surface 52B at one end in the axial direction, and a second end surface 52C at the other end opposite to the first end surface 52B. The first end surface 52B and the second end surface 52C are parallel to each other. Each of the first end surface 52B and the second end surface 52C is flat. In this embodiment, the second end surface 52C has a maximum height roughness Rz of 12.5 μm or less. The maximum height roughness Rz of the second end surface 52C is preferably 8 μm or less, more preferably 7 μm or less, and especially preferably 6.3 μm or less. The maximum height roughness Rz can be measured based on, for example, JIS B 0601. In this embodiment, for example, the second end surface 52C of the flange 52 is ground so that the flange 52 having the second end surface 52C satisfying the maximum height roughness Rz can be thereby formed. The second end surface 52C may be processed by a known method as well as grinding to satisfy the maximum height roughness Rz.

The ring 60 is fitted onto the outer peripheral surface of the projection 501 at the side opposite to the flange 52 in the axial direction when seen from the large diameter portion 51 of the first body 50. The ring 60 is fixed to the outer peripheral surface of the projection 501 by a known method. The ring 60 has an annular shape. The ring 60 includes an outer peripheral surface 61, an inner peripheral surface 62, a third end surface 63 at one end in the axial direction, and a fourth end surface 64 at the other end opposite to the third end surface 63. The outer peripheral surface 61 and the inner peripheral surface 62 are coaxial cylindrical surfaces. The third end surface 63 and the fourth end surface 64 are parallel to each other. With reference to FIG. 3, the ring 60 is disposed such that the third end surface 63 contacts a step surface 51B at the opposite side to the flange 52 of the large diameter portion 51 in the axial direction. The ring 60 is press fitted in the first body 50, and fixed to the first body 50. In this embodiment, the third end surface 63 of the ring 60 has a maximum height roughness Rz of 12.5 μm or less. The maximum height roughness Rz of the third end surface 63 is preferably 8 μm or less, more preferably 7 μm or less, and especially preferably 6.3 μm or less. The maximum height roughness Rz can be measured based on, for example, JIS B 0601. In this embodiment, for example, the third end surface 63 of the ring 60 is ground so that the ring 60 having the third end surface 63 satisfying the maximum height roughness Rz described above can be thereby formed. Since the flange 52 and the ring 60 are disposed to sandwich the large diameter portion 51 in the axial direction, it is possible to suppress detachment of the outer ring 20 and the plurality of rollers 40 in the axial direction. The third end surface 63 may be processed by a known method as well as grinding to satisfy the maximum height roughness Rz.

The inner member 10 is made of steel such as carbon steel for machine structure, alloy steel for machine structure, or bearing steel. In this embodiment, the inner member 10 is made of high-carbon chromium bearing steel. A heat treatment may be performed on a region of the first body 50 including the first rolling surface 51A. As the heat treatment, high-frequency quenching and tempering, for example, may be performed. Grinding may be performed on a region of the first body 50 including the first rolling surface 51A. In this embodiment, no heat treatment is performed on the flange 52.

The outer ring 20 includes an inner peripheral surface 21A, an outer peripheral surface 21B, a first outer ring end surface 21C at one end in the axial direction, and a second outer ring end surface 21D at the other end in the axial direction. The inner peripheral surface 21A includes a second rolling surface 22C facing the first rolling surface 51A of the first body 50. That is, the outer ring 20 includes the second rolling surface 22C in the inner peripheral surface 21A. The second rolling surface 22C has a cylindrical shape. In this embodiment, the outer peripheral surface 21B has a cylindrical shape. The first outer ring end surface 21C and the second outer ring end surface 21D are annular flat surfaces. The first outer ring end surface 21C and the second outer ring end surface 21D are orthogonal to the axial direction. The first outer ring end surface 21C and the second outer ring end surface 21D are parallel to each other. The first outer ring end surface 21C and the second outer ring end surface 21D are exposed to the outside in the follower bearing 1.

The inner peripheral surface 21A includes an annular first surface 22A and an annular third surface 22D sandwiching the second rolling surface 22C in the axial direction. The first surface 22A is disposed in the inner peripheral surface 21A at one end of the outer ring 20. The third surface 22D is disposed in the inner peripheral surface 21A at the other end of the outer ring 20. The diameter of each of the first surface 22A and the third surface 22D is larger than the diameter of the second rolling surface 22C. Each of the first surface 22A and the third surface 22D has a cylindrical shape whose center axis is coaxial with the rotation axis. The first surface 22A faces the outer peripheral surface 52A of the flange 52. The third surface 22D faces the outer peripheral surface 61 of the ring 60. The inner peripheral surface 21A further includes a second surface 22B connecting the first surface 22A and the second rolling surface 22C to each other, and a fourth surface 22E connecting the third surface 22D and the second rolling surface 22C to each other. The second surface 22B and the fourth surface 22E are annular flat surfaces. The second surface 22B and the fourth surface 22E are orthogonal to the axial direction. The second surface 22B and the fourth surface 22E are parallel to each other. The second surface 22B faces the second end surface 52C of the flange 52. The fourth surface 22E faces the third end surface 63 of the ring 60.

The outer ring 20 is made of steel such as carbon steel for machine structure, alloy steel for machine structure, or bearing steel. In this embodiment, the outer ring 20 is made of high-carbon chromium bearing steel. A heat treatment may be performed on a region of the outer ring 20 including the second rolling surface 22C. As the heat treatment, high-frequency quenching and tempering, for example, may be performed. Gliding may be performed on a region including the second rolling surface 22C.

Figure 4:
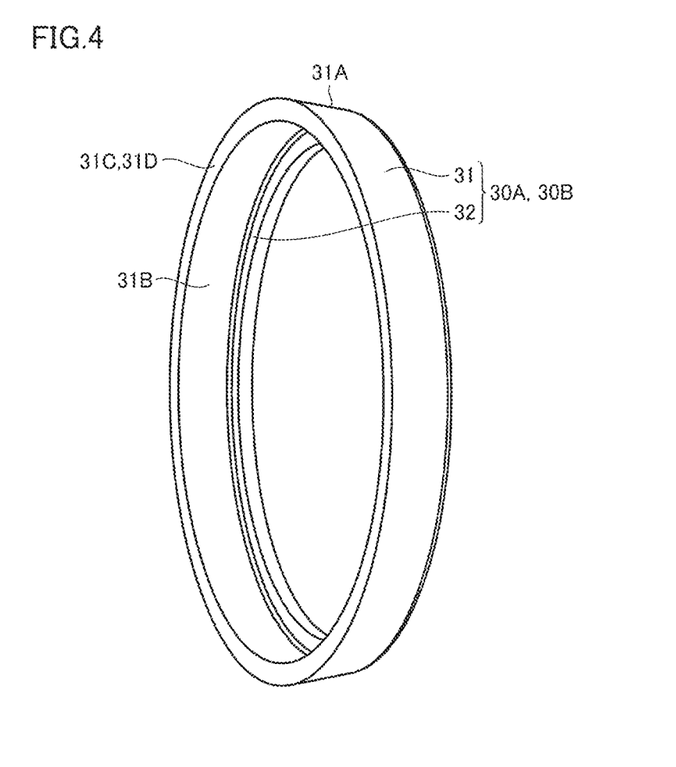
FIG. 4 is a perspective view schematically illustrating a structure of a sealing member.

With reference to FIGS. 2 through 4, each of the first sealing member 30A and the second sealing member 30B includes an annular portion 31 serving as a first portion or a third portion, and a projection 32 serving as a second portion or a fourth portion. The annular portion 31 has an annular shape. The annular portion 31 includes an outer peripheral surface 31A and an inner peripheral surface 31B. The outer peripheral surface 31A has a conical surface. The inner peripheral surface 31B has a cylindrical surface. Each of the outer peripheral surface 31A and the inner peripheral surface 31B has a center axis coaxial with the rotation axis. The outer peripheral surface 31A of the annular portion 31 has a tapered shape whose diameter gradually increases toward one end. The outer diameter of the annular portion 31 is smaller than the inner diameter of each of the first surface 22A and the third surface 22D. The projection 32 is connected to the annular portion 31. The projection 32 projects from the other end of the annular portion 31 inward in the radial direction. The projection 32 has an annular shape. The projection 32 has a flat annular shape. The projection 32 is coaxial with the annular portion 31. The projection 32 includes an end surface 32A at one end in the axial direction, and an end surface 32B at the other end in the axial direction.

With reference to FIG. 3, the annular portion 31 of the first sealing member 30A is disposed between the outer peripheral surface 52A of the flange 52 and the first surface 22A in the radial direction. A gap is formed between the outer peripheral surface 31A of the annular portion 31 of the first sealing member 30A and the first surface 22A. An unillustrated gap is formed between the annular portion 31 and the outer peripheral surface 52A of the flange 52. The annular portion 31 is clearance-fitted with the flange 52. The first sealing member 30A is a so-called non-contact seal. The projection 32 on the first sealing member 30A is disposed between the second end surface 52C of the flange 52 and the second surface 22B in the axial direction. The end surface 32A of the projection 32 can contact the second end surface 52C of the flange 52. The end surface 32B of the projection 32 faces the second surface 22B in the axial direction. A gap is formed between the first sealing member 30A and the outer ring 20 and a gap is formed between the first sealing member 30A and the flange 52 so that increases in, for example, sliding resistance of the outer ring 20 and a rotation torque caused by the presence of the first sealing member 30A can be reduced, resulting in smooth rotation of the outer ring 20. The outer peripheral surface 31A and the first surface 22A may be in contact with each other to form no gap. The flange 52 and the first sealing member 30A may be tightly in contact with each other.

The annular portion 31 of the second sealing member 30B is disposed between the outer peripheral surface 61 of the ring 60 and the third surface 22D in the radial direction. A gap is formed between the outer peripheral surface 31A of the annular portion 31 of the second sealing member 30B and the third surface 22D. An unillustrated gap is formed between the annular portion 31 and the outer peripheral surface 61 of the ring 60. The annular portion 31 is clearance-fitted with the ring 60. The second sealing member 30B is a so-called non-contact seal. The projection 32 on the second sealing member 30B is disposed between the third end surface 63 of the ring 60 and the fourth surface 22E in the axial direction. The end surface 32A of the projection 32 can contact the third end surface 63 of the ring 60. The end surface 32B of the projection 32 faces the fourth surface 22E in the axial direction. A gap is formed between the second sealing member 30B and the outer ring 20 and a gap is formed between the second sealing member 30B and the ring 60 so that increases in, for example, sliding resistance of the outer ring 20 and a rotation torque caused by the presence of the second sealing member 30B can be reduced, resulting in smooth rotation of the outer ring 20. The outer peripheral surface 61 and the third surface 22D may be in contact with each other to form no gap. The ring 60 and the second sealing member 30B may be tightly in contact with each other.

The annular portion 31 of the first sealing member 30A includes a first sealing end surface 31C located near the first end surface 52B in the axial direction. The annular portion 31 of the second sealing member 30B includes a second sealing end surface 31D located near a fourth end surface 64 in the axial direction. The first sealing end surface 31C and the second sealing end surface 31D are annular flat surfaces. The first sealing end surface 31C and the second sealing end surface 31D are perpendicular to the axial direction. The first sealing end surface 31C and the second sealing end surface 31D are in parallel to each other. The first sealing end surface 31C is disposed inside the first outer ring end surface 21C in the bearing in the axial direction. In this embodiment, a space 71 having an opening in the axial direction is formed by the first surface 22A of the outer ring 20, the outer peripheral surface 52A of the flange 52, and the first sealing end surface 31C of the first sealing member 30A. The second sealing end surface 31D is disposed inside the second outer ring end surface 21D in the bearing in the axial direction. In this embodiment, a space 72 having an opening in the axial direction is formed by the third surface 22D of the outer ring 20, the outer peripheral surface 61 of the ring 60, and the second sealing end surface 31D of the second sealing member 30B.

A material constituting each of the first sealing member 30A and the second sealing member 30B is at least one resin selected from the group consisting of polyether ether ketone, polyacetal, and polyamide. In this embodiment, the material constituting each of the first sealing member 30A and the second sealing member 30B is, for example, nylon 66. The material constituting each of the first sealing member 30A and the second sealing member 30B may be, for example, nylon 66 supplemented with molybdenum disulfide. Instead of nylon 66, molybdenum disulfide, for example, may be included. In the case of using nylon 66 as the material constituting the first sealing member 30A and the second sealing member 30B, the first sealing member 30A and the second sealing member 30B are soft and susceptible to wearing. When the maximum height roughness Rz of each of the second end surface 52C and the third end surface 63 is 6.3 µm or less, wearing of the first sealing member 30A and the second sealing member 30B can be further reduced.

With reference to FIGS. 2 through 4, the plurality of rollers 40 are disposed to be rollable on the first rolling surface 51A and the second rolling surface 22C. Each of the rollers 40 has a solid cylindrical shape. Each roller 40 has a cylindrical outer peripheral surface 41 and a pair of spherical end surfaces 42. The end surfaces 42 may be flat. The outer peripheral surface 41 of each roller 40 is in contact with the first rolling surface 51A and the second rolling surface 22C. The rollers 40 are made of steel such as bearing steel. The rollers 40 may be quenched and hardened.

Figure 5:
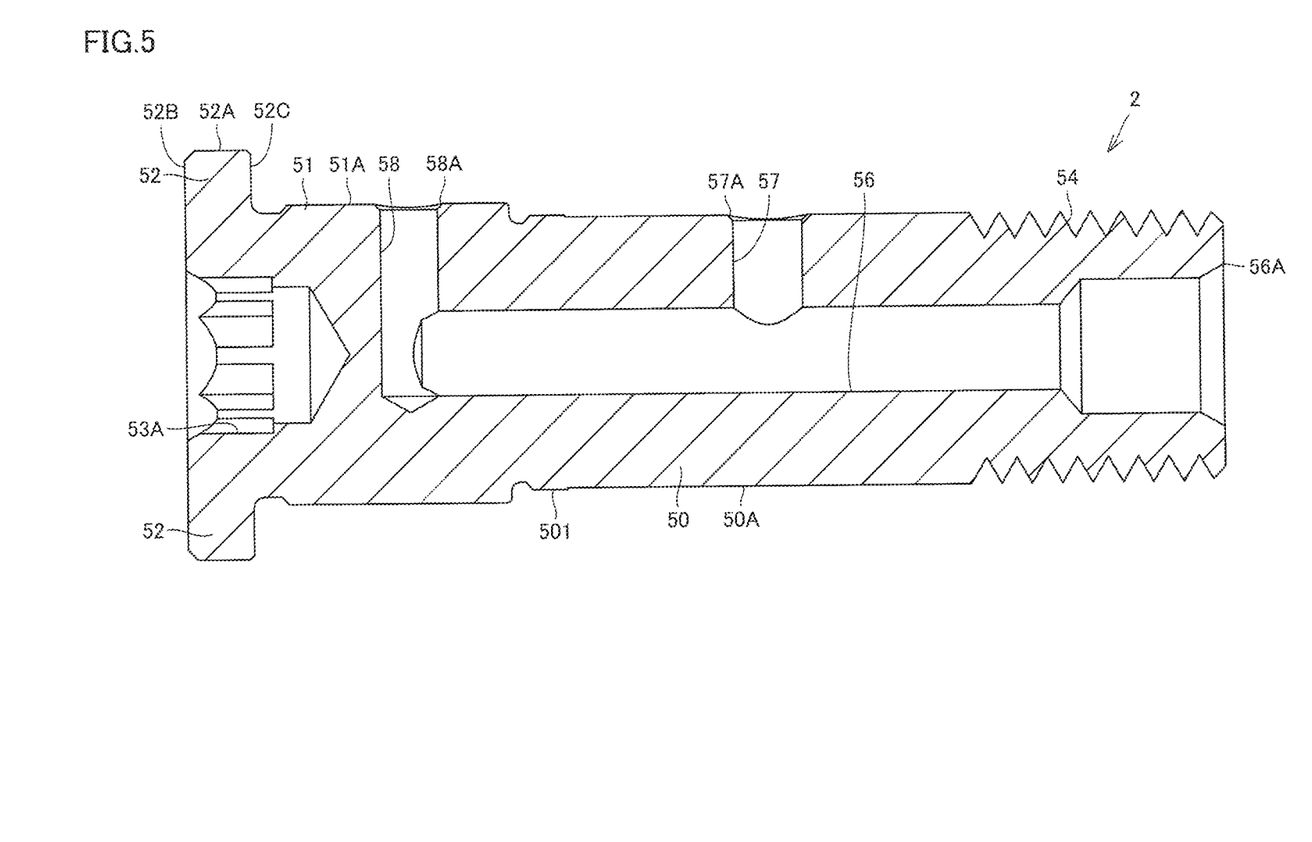
FIG. 5 is a schematic cross-sectional view for describing a method for assembling a follower bearing.
Figure 6:
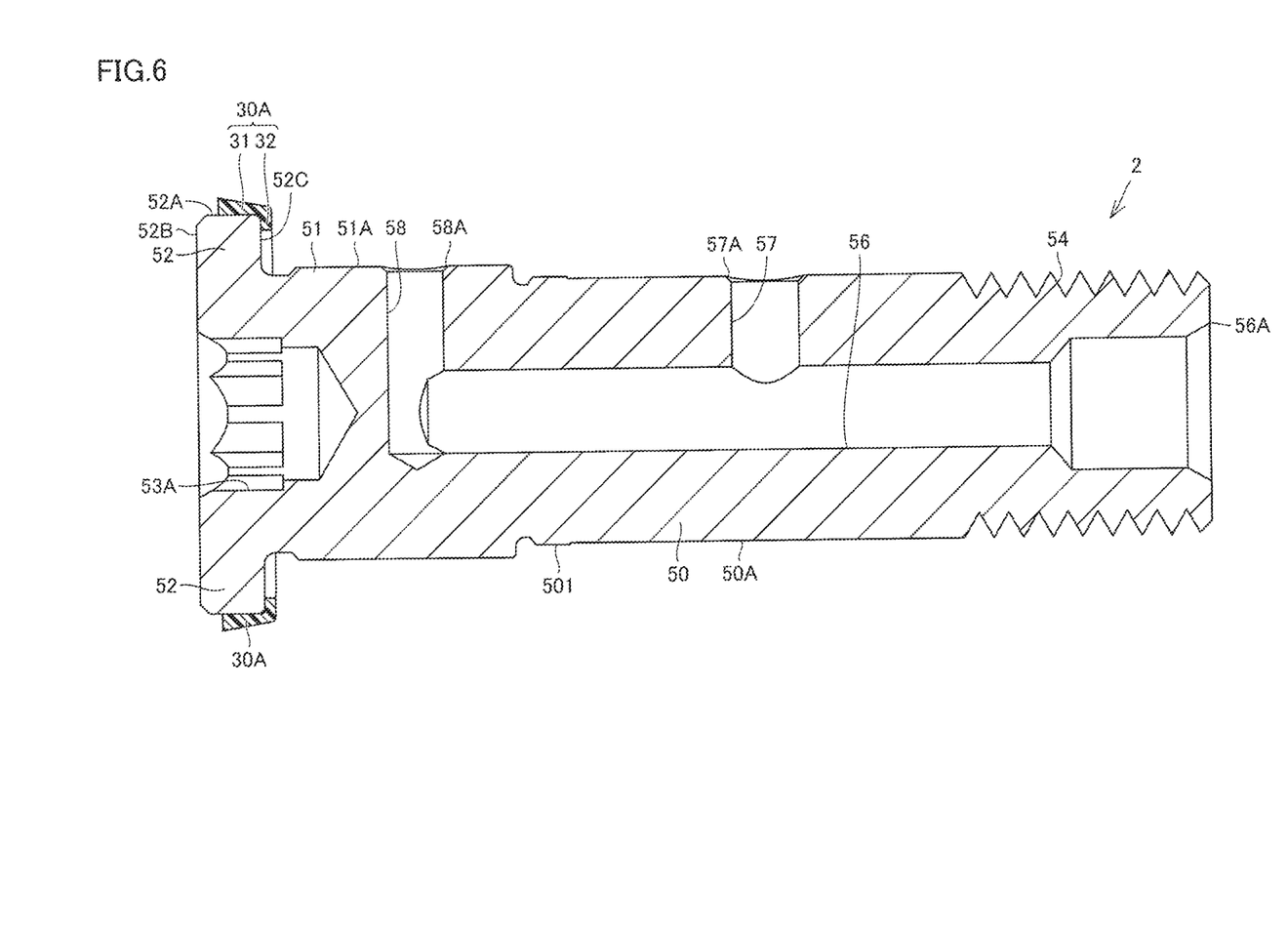
FIG. 6 is a schematic cross-sectional view for describing the method for assembling a follower bearing.
Figure 7:
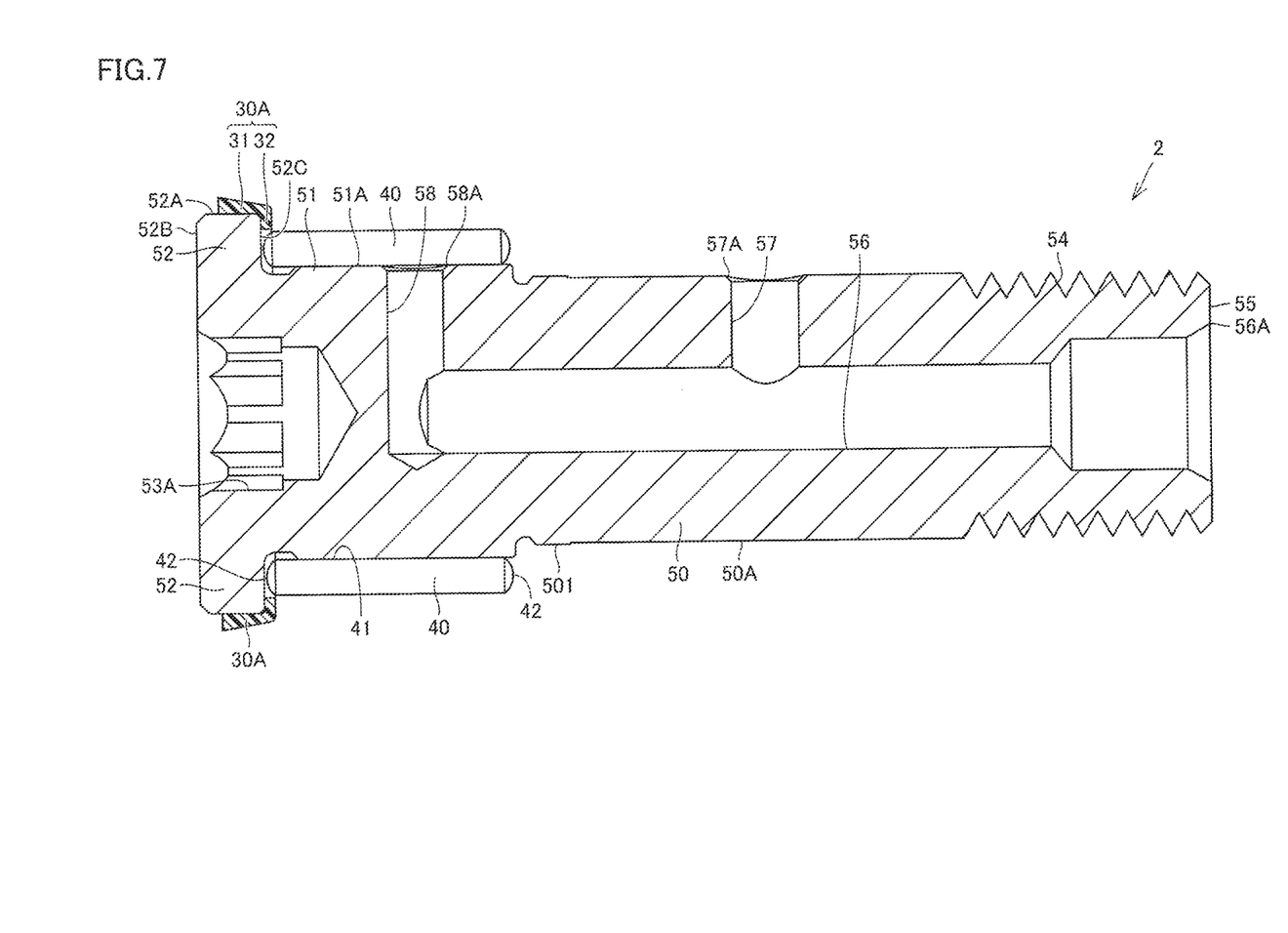
FIG. 7 is a schematic cross-sectional view for describing the method for assembling a follower bearing.
Figure 8:
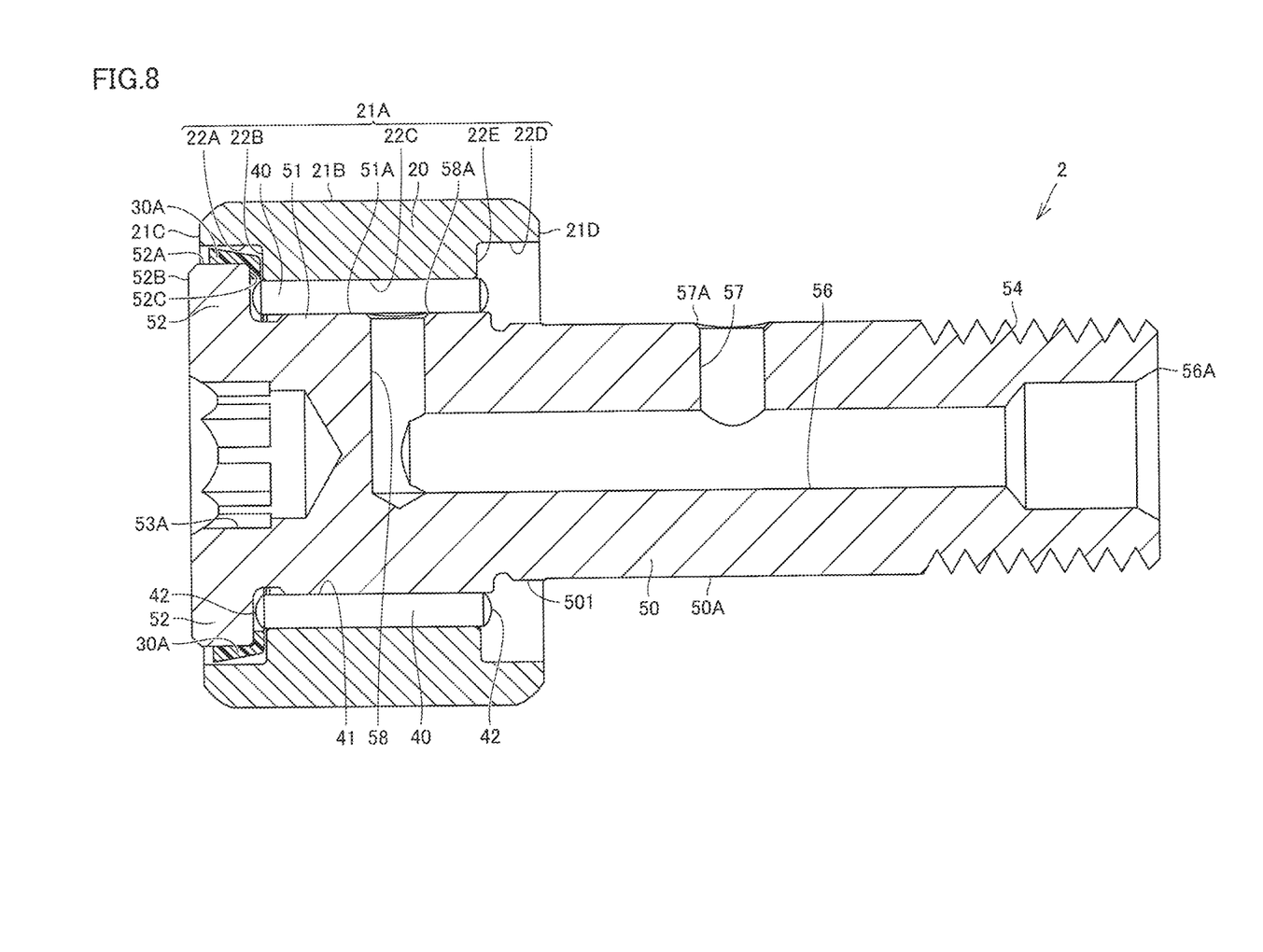
FIG. 8 is a schematic cross-sectional view for describing the method for assembling a follower bearing.

A method for assembling the follower bearing 1 in this embodiment will now be described. First, with reference to FIG. 5, an intermediate body 2 including the first body 50 and the flange 52 is prepared. Next, with reference to FIGS. 5 and 6, the first sealing member 30A is attached to the intermediate body 2. An end portion 55 of the first body 50 is inserted in the first sealing member 30A, and the projection 32 of the first sealing member 30A is in contact with the second end surface 52C of the flange 52. Then, with reference to FIGS. 6 and 7, the rollers 40 are disposed with respect to the intermediate body 2 to which the first sealing member 30A is attached. At this time, the rollers 40 are disposed such that the outer peripheral surfaces 41 of the rollers 40 are in contact with the first rolling surface 51A. Thereafter, with reference to FIGS. 7 and 8, the first sealing member 30A is attached, and an outer ring 20 is attached to the intermediate body 2 provided with the rollers 40. The end portion 55 of the first body 50 is inserted in the outer ring 20, and the second rolling surface 22C of the outer ring 20 is brought into contact with the outer peripheral surfaces 41 of the rollers 40 and face the first rolling surface 51A. Subsequently, with reference to FIGS. 2, 3, and 8, the ring 60 provided with the second sealing member 30B is attached to the intermediate body 2 to which the first sealing member 30A and the outer ring 20 are attached and in which the rollers 40 are disposed. The end portion 55 of the first body 50 is inserted in the ring 60 and the ring 60 is fitted in the first body 50 to contact a step surface 51B of the large diameter portion 51, thereby fixing the ring 60 to the first body 50. Through the foregoing steps, the follower bearing 1 according to this embodiment is completed.

Here, the follower bearing 1 according to this embodiment includes the first sealing member 30A. The first sealing member 30A includes the annular portion 31 forming a sealing structure between the annular portion 31 and the outer ring 20. The annular portion 31 has an outer diameter that gradually increases toward the first end surface 52B. Since the first sealing member 30A includes the annular portion 31, the outer ring 20 is guided by the annular portion 31 in attaching the outer ring 20 to the inner member 10 so that the outer ring 20 is less likely to get stuck on the first sealing member 30A. Thus, with the configuration of the follower bearing 1 according to this embodiment, the follower bearing 1 can be easily assembled.

In this embodiment, the annular portion 31 of the first sealing member 30A has a tapered shape whose outer diameter gradually increases toward the first end surface 52B. Thus, in inserting the inner member 10 in the outer ring 20, the outer ring 20 is more reliably guided by the annular portion 31 of the first sealing member 30A so that the outer ring 20 is much less likely to get stuck on the first sealing member 30A. Thus, with the configuration of the follower bearing 1 according to the present disclosure, the follower bearing 1 can be more easily assembled.

In the embodiment described above, the first sealing member 30A includes the projection 32. Since the first sealing member 30A includes the projection 32, when an axial load caused by, for example, misalignment is applied to the follower bearing 1, contact between the second end surface 52C of the flange 52 and the second surface 22B of the outer ring 20 can be suppressed. Thus, it is possible to suppress occurrence of, for example, wearing caused by contact between the second end surface 52C of the flange 52 and the second surface 22B of the outer ring 20.

In the embodiment, the second end surface 52C of the flange 52 has a maximum height roughness Rz of 12.5 μm or less. With this configuration, when an axial load is applied to the follower bearing 1, wearing of the first sealing member 30A and the second end surface 52C of the flange 52 can be reduced.

In the embodiment, the second end surface 52C of the flange 52 and the third end surface 63 of the ring 60 are ground. In the embodiment, the second surface 22B of the outer ring 20 and the fourth surface 22E are not ground. That is, the maximum height roughness Rz of each of the second surface 22B and the fourth surface 22E is larger than 12.5 μm. In this embodiment, when an axial load is applied to the follower bearing 1, an area in which the first sealing member 30A is in contact with the second surface 22B is larger than an area in which the first sealing member 30A is in contact with the second end surface 52C. That is, a friction force occurring between the first sealing member 30A and the outer ring 20 is larger than a friction force occurring between the first sealing member 30A and the flange 52. In a manner similar to the first sealing member 30A, when an axial load is applied to the follower bearing 1, an area in which the second sealing member 30B is in contact with the fourth surface 22E is larger than an area in which the second sealing member 30B is in contact with the third end surface 63. That is, a friction force occurring between the second sealing member 30B and the outer ring 20 is larger than a friction force occurring between the second sealing member 30B and the ring 60. At this time, the first sealing member 30A or the second sealing member 30B rotates relative to the inner member 10 together with the outer ring 20 in some cases. When the first sealing member 30A or the second sealing member 30B rotates, sliding friction occurs between the first sealing member 30A and the second end surface 52C or between the second sealing member 30B and the third end surface 63, and wearing of the first sealing member 30A or the second sealing member 30B occurs. By reducing the maximum height roughness Rz of each of the second end surface 52C and the third end surface 63, occurrence of the sliding friction is reduced so that wearing of the first sealing member 30A and the second sealing member 30B is thereby reduced. In the case described above, the second surface 22B of the outer ring 20 is not ground. However, the present disclosure is not limited to this case, and the second surface 22B of the outer ring 20 may be ground.

In the embodiment, the first sealing end surface 31C is disposed inside the first outer ring end surface 21C in the bearing in the axial direction, and the first surface 22A of the outer ring 20, the outer peripheral surface 52A of the flange 52, and the first sealing end surface 31C of the first sealing member 30A form a gap having an opening in the axial direction. With this configuration, even when a tolerance of dimensions of members constituting the follower bearing 1 is accumulated, the first sealing end surface 31C is less likely to project to the outer side of the bearing from the first outer ring end surface 21C in the axial direction. Thus, the outer peripheral surface 31A of the first sealing member 30A is less likely to be exposed to the outside of the bearing, and dust is not easily accumulated on the outer peripheral surface 31A of the first sealing member 30A. In resin molding of the first sealing member 30A having such a shape, there are few narrow corner areas, and thus, the first sealing member 30A can be easily molded.

In the embodiment, the follower bearing 1 includes the second sealing member 30B. In a manner similar to the first sealing member 30A, the second sealing member 30B includes the annular portion 31 and the projection 32. The annular portion 31 of the second sealing member 30B has an outer diameter that gradually increases toward the fourth end surface 64 of the ring 60. Since the second sealing member 30B includes the annular portion 31, in attaching the ring 60 provided with the second sealing member 30B to the first body 50, the ring 60 is guided by the outer peripheral surface 31A of the annular portion 31, and the second sealing member 30B is less likely to get stuck on the outer ring 20. Accordingly, the ring 60 provided with the second sealing member 30B can be easily attached to the first body 50. In addition, since the second sealing member 30B includes the projection 32, when an axial load is applied to the follower bearing 1, contact between the third end surface 63 of the ring 60 and the fourth surface 22E can be suppressed. Thus, it is possible to suppress occurrence of, for example, wearing caused by contact between the third end surface 63 of the ring 60 and the fourth surface 22E of the outer ring 20.

In the embodiment, the annular portion 31 of the second sealing member 30B has a tapered shape whose outer diameter gradually increases toward the fourth end surface 64. Thus, in attaching the ring 60 to the first body 50, the ring 60 is more reliably guided by the annular portion 31 of the second sealing member 30B, and the second sealing member 30B is much less likely to get stuck on the outer ring 20. Thus, with the configuration of the follower bearing 1 according to the present disclosure, the follower bearing 1 can be more easily assembled.

In the embodiment, the second sealing end surface 31D is disposed inside the second outer ring end surface 21D in the bearing in the axial direction, and the third surface 22D of the outer ring 20, the outer peripheral surface 61 of the ring 60, and the second sealing end surface 31D of the second sealing member 30B form the space 72 having the opening in the axial direction. With this configuration, even when a tolerance of dimensions of members constituting the follower bearing 1 is accumulated, the second sealing end surface 31D is less likely to project to the outer side of the bearing from the second outer ring end surface 21D in the axial direction. Thus, the outer peripheral surface 31A of the second sealing member 30B is less likely to be exposed to the outside of the bearing, and dust is not easily accumulated on the outer peripheral surface 31A of the second sealing member 30B. In resin molding of the second sealing member 30B having such a shape, there are few narrow coiner areas, and thus, the second sealing member 30B can be easily molded.

In the embodiment, the third end surface 63 of the ring 60 has a maximum height roughness Rz of 12.5 µm or less. With this configuration, when an axial load is applied to the follower bearing 1, wearing of the second sealing member 30B and the third end surface 63 of the ring 60 can be reduced. The third end surface 63 of the ring 60 may have a maximum height roughness Rz larger than 12.5 µm depending on application of the follower bearing 1.

In the embodiment, the annular portion 31 of the first sealing member 30A has a tapered shape whose outer diameter gradually increases toward the first end surface 52B, but the present disclosure is not limited to this example. For example, the outer peripheral surface 31A of the annular portion 31 of the first sealing member 30A may have an arc shape in the cross section illustrated in FIGS. 2 and 3, that is, a cross section including the rotation axis of the follower bearing 1, and may have an outer diameter that gradually increases toward the first end surface 52B. Specifically, in the arc shape, the increase rate of the diameter of the outer peripheral surface 31A gradually decreases toward the first end surface 52B, or the increase rate of the diameter of the outer peripheral surface 31A gradually increases toward the first end surface 52B. The outer peripheral surface 31A of the annular portion 31 of the first sealing member 30A may include an arc region and a tapered region. That is, in the outer peripheral surface 31A of the annular portion 31 of the first sealing member 30A, the arc region and the tapered region may be continuous in the axial direction. The outer peripheral surface 31A of the annular portion 31 of the first sealing member 30A may include a curved surface. Similarly, the annular portion 31 of the second sealing member 30B has a tapered shape whose outer diameter gradually increases toward the fourth end surface 64, but the present disclosure is not limited to this embodiment. For example, the outer peripheral surface 31A of the annular portion 31 of the second sealing member 30B may have an arc shape in the cross section illustrated in FIGS. 2 and 3, that is, a cross section including the rotation axis of the follower hearing 1, and have an outer diameter that gradually increases toward the fourth end surface 64. The same holds fix the following embodiments.

Figure 9:
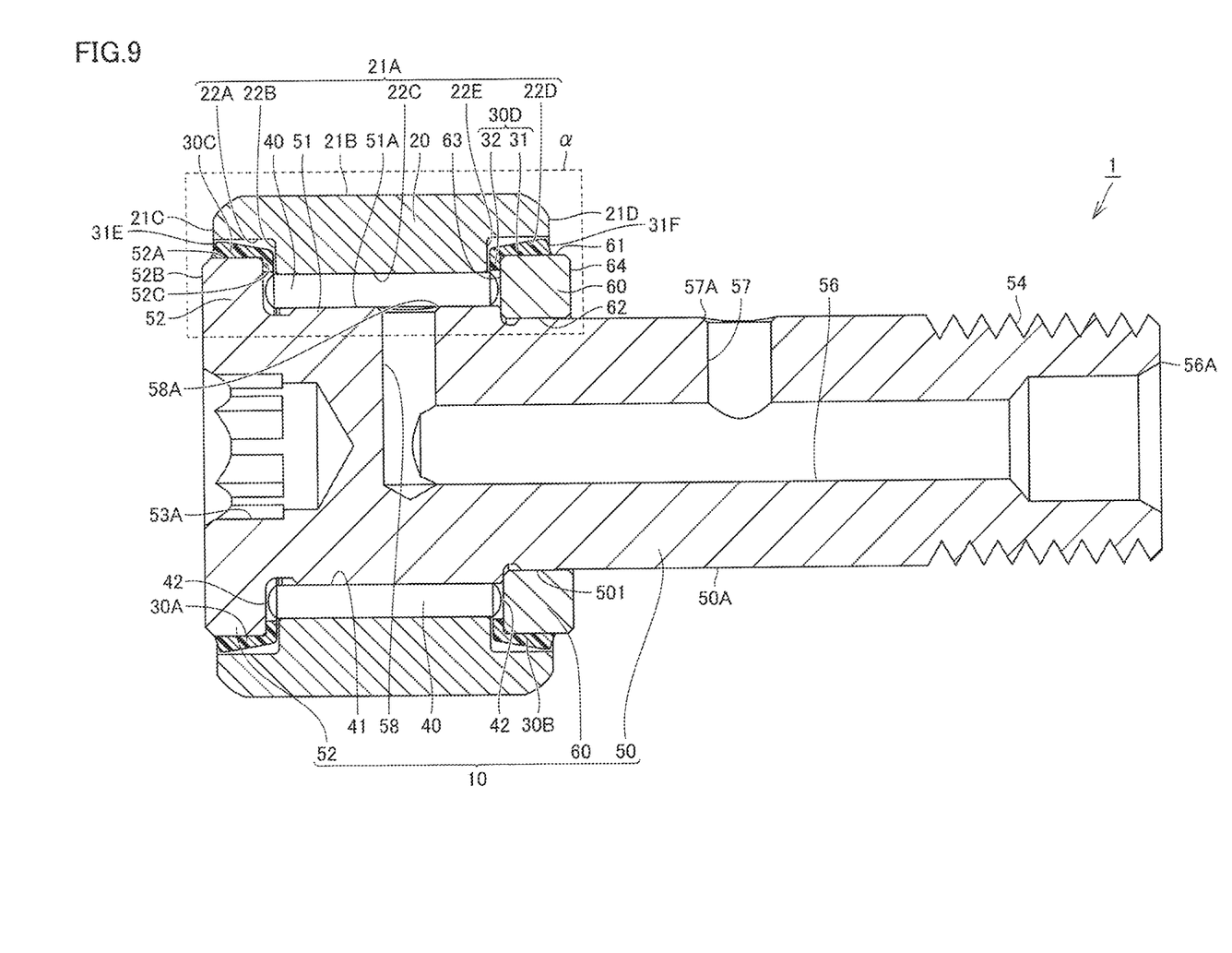
FIG. 9 is a cross-sectional view schematically illustrating a structure of a follower bearing according to another embodiment.
Figure 10:
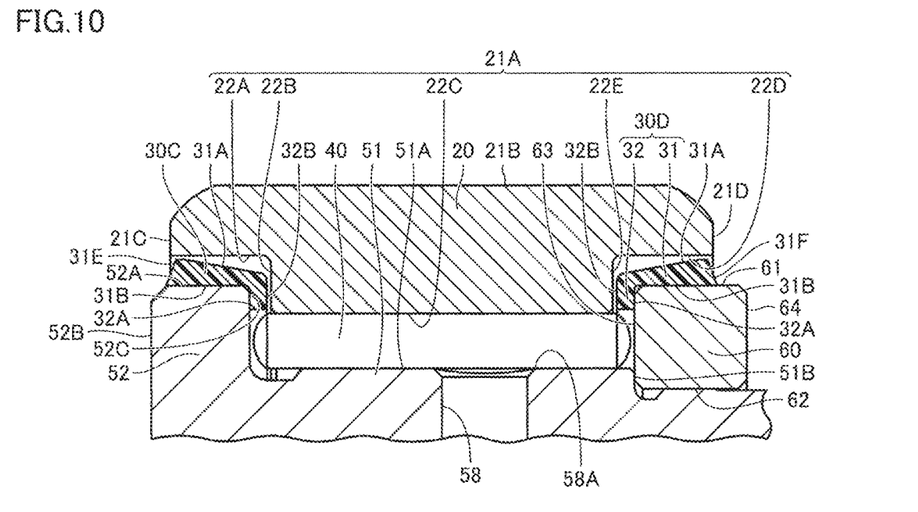
FIG. 10 is an enlarged schematic cross-sectional view of a region α in FIG. 9.

Other embodiments will now be described. FIG. 9 is a cross-sectional view schematically illustrating a structure of a follower bearing according to another embodiment. FIG. 9 shows a cross section including a rotation axis of the follower bearing. FIG. 10 is an enlarged schematic cross-sectional view of a region α in FIG. 9. The follower bearing illustrated in FIG. 9 is different from the follower bearing illustrated in FIGS. 1 and 2 in that the structures of a first sealing member and a second sealing member are different from those of the follower hearing illustrated in FIGS. 1 and 2.

With reference to FIGS. 9 and 10, the follower bearing 1 according to another embodiment includes a first sealing member 30C and a second sealing member 30D. In a manner similar to the first sealing member 30A, the first sealing member 30C includes an annular portion 31 and a projection 32. An outer peripheral surface 31A of the annular portion 31 of the first sealing member 30C has a tapered shape whose outer diameter gradually increases toward a first end surface 52B of a flange 52. The first sealing member 30C includes a first sealing end surface 31E located near the first end surface 52B in the axial direction. The first sealing end surface 31E has a shape whose outer diameter gradually decreases toward the first end surface 52B. Specifically, the first sealing end surface 31E has a tapered shape whose outer diameter gradually decreases toward the first end surface 52B. The first sealing end surface 31E extends to the first end surface 52B in the axial direction. In this embodiment, the first end surface 52B is subjected to so-called C chamfering, and the first sealing end surface 31E extends to the chamfered first end surface 52B. In this embodiment, the space 71 shown in FIGS. 2 and 3 are not provided.

The second sealing member 30D includes an annular portion 31 and a projection 32, in a manner similar to the second sealing member 30B. An outer peripheral surface 31A of the annular portion 31 of the second sealing member 30D has a tapered shape whose outer diameter gradually increases toward a fourth end surface 64 of a ring 60. The second sealing member 30D includes a second sealing end surface 31F located near the fourth end surface 64 in the axial direction. The second sealing end surface 31F has a shape whose outer diameter gradually decreases toward the fourth end surface 64. Specifically, the second sealing end surface 31F has a tapered shape whose outer diameter gradually decreases toward the fourth end surface 64. The second sealing end surface 31F does not reach the fourth end surface 64 of the ring 60 in the axial direction. In this embodiment, the space 72 shown in FIGS. 2 and 3 are not provided.

In the embodiment, even when dust is accumulated on the first sealing end surface 31E, the shape of the first sealing end surface 31E described above facilitates sliding of the dust accumulated on the first sealing end surface 31E downward toward the first end surface 52B, Accordingly, dust is less likely to be accumulated on the first sealing end surface 31E. Thus, dust on the first sealing end surface 31E is less likely to enter the inside of the bearing across the outer peripheral surface 31A of the first sealing member 30C so that dustproof performance of the follower bearing 1 can be enhanced.

In the embodiment, the first sealing end surface 31E has a tapered shape whose outer diameter gradually decreases toward the first end surface 52B. Thus, dust accumulated on the first sealing end surface 31E can be more reliably caused to slide down toward the first end surface 52B. Accordingly, dust is much less likely to be accumulated on the first sealing end surface 31E. Thus, dust on the first sealing end surface 31E is much less likely to enter the inside of the bearing across the outer peripheral surface 31A of the first sealing member 30C so that dustproof performance of the follower bearing 1 can be further enhanced.

In the embodiment, the first sealing end surface 31E extends to the first end surface 52B in the axial direction. Accordingly, dust accumulated on the first sealing end surface 31E having the shape described above can smoothly slide down to the first end surface 52B so that dust is less likely to be accumulated in a region between the first sealing end surface 31E and the outer peripheral surface 52A of the flange 52. Thus, dustproof performance of the follower bearing 1 can be enhanced.

In the embodiment, the second sealing member 30D includes a second sealing end surface 31F located near the fourth end surface 64 in the axial direction. The second sealing end surface 31F has an outer diameter that gradually decreases toward the fourth end surface 64. Thus, even when dust is accumulated on the second sealing end surface 31F, the shape of the second sealing end surface 31F described above facilitates sliding of the dust accumulated on the second sealing end surface 31F downward toward the fourth end surface 64. Accordingly, dust is less likely to be accumulated on the second sealing end surface 31F. Thus, dust on the second sealing end surface 31F is less likely to enter the inside of the bearing across the outer peripheral surface 31A of the second sealing member 30D so that dustproof performance of the follower bearing 2 can be enhanced.

In the embodiment, the second sealing end surface 31F has a tapered shape whose outer diameter gradually decreases toward the fourth end surface 64. Thus, dust accumulated on the second sealing end surface 31F can be more reliably caused to slide down toward the fourth end surface 64. Accordingly, dust is much less likely to be accumulated on the second sealing end surface 31F. Thus, dust on the second sealing end surface 31F is much less likely to enter the inside of the bearing across the outer peripheral surface 31A of the second sealing member 30D so that dustproof performance of the follower bearing 1 can be further enhanced.

In the embodiment, the second sealing end surface 31F may extend to the fourth end surface 64 in the axial direction. Accordingly, dust accumulated on the second sealing end surface 31F having the shape described above can smoothly slide down to the fourth end surface 64 so that dust is less likely to be accumulated in a region between the second sealing end surface 31F and the outer peripheral surface 61 of the ring 60. Thus, dustproof performance of the follower bearing 1 can be enhanced. The first end surface 52B of the flange 52 may not be chamfered.

In the embodiment, the first body 50 has a first hole 56 extending along the axial direction. The first body 50 has a second hole 57 communicating with the first hole 56 and having an opening 57A in an outer peripheral surface 50A. The first body 50 has a third hole 58 having an opening 58A in a first rolling surface 51A and communicating with the first hole 56. A lubricant is injected from the opening. 56A of the first hole 56 so that refueling can be performed to the outer peripheral surface 41 of the rollers 40 through the first hole 56 and the third hole 58. A grease nipple or a stop cock may be attached to close the opening 56A of the first hole 56.

In the embodiment, the outer peripheral surface 21B of the outer ring 20 has a cylindrical shape, but the present disclosure is not limited to this example, and the outer peripheral surface 21B may be spherical. In the embodiment, the rollers 40 are employed as rolling elements of the follower bearing 1, but balls may be employed as rolling elements. In the embodiment, the rolling elements are arranged in a single line, but may be arranged in a plurality of lines. In the embodiment, the inner member 10 includes the first body 50 having the first rolling surface 51A in the outer peripheral surface 50A thereof, but the present disclosure is not limited to this example, and the inner member 10 may include the first body 50 and an inner ring having the first rolling surface 51A in the outer peripheral surface thereof and configured to be fitted in the first body 50. A gap is formed between the first sealing member 30A and the outer ring 20 and between the first sealing member 30A and the flange 52. A gap is also formed between the second sealing member 30B and the outer ring 20 and between the second sealing member 30B and the flange 52. The presence of such gaps can reduce an increase in, for example, a rotation torque of the outer ring 20 caused by providing the first sealing member 30A and the second sealing member 30B, and the outer ring 20 can smoothly rotate. Although the follower bearing 1 is a full roller bearing including no cages in the embodiment, the present disclosure is not limited to this example, and the follower bearing 1 may include a cage.

In the present disclosure, the follower bearing 1 refers to a bearing that rotates circumferentially with respect to the first body 50 while the outer ring 20 are in contact with another member with the first body 50 fixed. This other member is not specifically limited, and may be a cam, a rail, or a belt, for example. The follower bearing 1 according to the embodiment can smoothly guide, for example, linear movement in machines such as machine tools or industrial robots.

It should be understood that the embodiments disclosed here are illustrative and non-restrictive in every respect. The scope of the present invention is defined by the terms of the claims, rather than the description above, and is intended to include any modifications within the scope and meaning equivalent to the terms of the claims.

DESCRIPTION OF REFERENCE CHARACTERS 1 follower bearing, 2 intermediate body, 10 inner member, 20 outer ring, 21A, 31B, 62 inner peripheral surface, 21B, 31A, 41, 50A, 52A, 61 outer peripheral surface, 21C first outer ring end surface, 21D second outer ring end surface, 22A first surface, 22B second surface, 22C second rolling surface, 22D third surface, 22E fourth surface, 30A, 30C first sealing member, 30B, 30D second sealing member, 31 annular portion, 31C, 31E first sealing end surface, 31D, 31F second sealing end surface, 32 projection, 32A, 32B, 42 end surface, 40 roller, 50 first body, 501 projection, 51 large diameter portion, 51A first rolling surface, 51B step surface, 52 flange, 52B first end surface, 52C second end surface, 53A hexagonal hole, 54 screw portion, 55 end, 56 first hole, 56A, 57A, 58A opening, 57 second hole, 58 third hole, 60 ring, 63 third end surface, 64 fourth end surface, 71, 72 space, Rz maximum height roughness, α region.

The invention claimed is:
1. A follower bearing comprising:
an inner member including a first body and a flange, the first body having a rod shape and having an annular first rolling surface in an outer peripheral surface of the first body, the flange having an annular shape, disposed on the outer peripheral surface at one end of the first body, having a center axis coaxial with the first body, and having a diameter larger than a diameter of the first body;
an outer ring having, in an inner peripheral surface, an annular first surface, an annular second rolling surface, and an annular second surface, the first surface facing an outer peripheral surface of the flange, the second rolling surface facing the first rolling surface and the second rolling surface having a diameter smaller than a diameter of the first rolling surface, the second surface connecting the second rolling surface and the first surface to each other;
a plurality of rolling elements disposed to be rollable on the first rolling surface and the second rolling surface; and
a first sealing member including an annular first portion and an annular second portion, the first portion being disposed between the outer peripheral surface of the flange and the first surface and at least partially forming a sealing structure between the first portion and the outer ring, the second portion being connected to the first portion,
wherein the flange includes a first end surface and a second end surface, the first end surface being at an end of the flange opposite to the first rolling surface in an axial direction, the second end surface being at an end of the flange opposite to the first end surface in the axial direction, the second surface being opposite to the second end surface in the axial direction, the second portion being disposed between the second end surface and the second surface and projecting inward in a radial direction, the first portion having an outer diameter that increases toward the first end surface in the axial direction, in a region extending from a connecting portion with the second portion to a first sealing end surface located near the first end surface in the axial direction.

2. The follower bearing according to claim 1, wherein the first portion has a tapered shape whose outer diameter increases toward the first end surface.

3. The follower bearing according to claim 2, wherein the second end surface of the flange has a maximum height roughness Rz of 12.5 μm or less.

4. The follower bearing according to claim 2, wherein the first sealing end surface has an outer diameter that decreases toward the first end surface.

5. The follower bearing according to claim 1, wherein the second end surface of the flange has a maximum height roughness Rz of 12.5 μm or less.

6. The follower bearing according to claim 5, wherein the first sealing end surface has an outer diameter that decreases toward the first end surface.

7. The follower bearing according to claim 1, wherein the first sealing end surface has an outer diameter that decreases toward the first end surface.

8. The follower bearing according to claim 7, wherein the first sealing end surface has a tapered shape whose outer diameter decreases toward the first end surface.

9. The follower bearing according to claim 7, wherein the first sealing end surface extends to the first end surface in the axial direction.

10. The follower bearing according to claim 1, wherein the inner member further includes a ring fitted in the first body to contact the outer peripheral surface opposite to the flange and having a center axis coaxial with the first body, when seen from the first rolling surface of the first body, the inner peripheral surface of the outer ring further has an annular third surface and an annular fourth surface, the third surface facing an outer peripheral surface of the ring and having a diameter larger than a diameter of the second rolling surface, the fourth surface connecting the second rolling surface and the third surface to each other and facing a third end surface, the third end surface being adjacent the first rolling surface of the ring in the axial direction, the follower bearing further includes a second sealing member which includes an annular third portion and an annular fourth portion, the third portion being disposed between the outer peripheral surface of the ring and the third surface and at least partially forming a sealing structure between the third portion and the outer ring, the fourth portion being connected to the third portion and disposed between the third end surface and the fourth surface, the fourth portion projects inward in a radial direction, and the third portion has an outer diameter that increases toward a fourth end surface, the fourth end surface being at an end opposite to the third end surface of the ring in the axial direction, in a region extending from a connecting portion with the fourth portion to a second sealing end surface located near the fourth end surface in the axial direction.

11. The follower bearing according to claim 10, wherein the third portion has a tapered shape whose outer diameter increases toward the fourth end surface.

12. The follower bearing according to claim 10, wherein the third end surface of the ring has a maximum height roughness Rz of 12.5 μm or less.

13. The follower bearing according to claim 10, wherein the second sealing end surface has an outer diameter that decreases toward the fourth end surface.

14. The follower bearing according to claim 13, wherein the second sealing end surface has a tapered shape whose outer diameter decreases toward the fourth end surface.

15. The follower bearing according to claim 13, wherein the second sealing end surface extends to the fourth end surface in the axial direction.

16. The follower bearing according to claim 10, wherein a material constituting the second sealing member is at least a resin selected from the group consisting of polyether ether ketone, polyacetal and polyamide.

17. The follower bearing according to claim 1, wherein a material constituting the first sealing member is at least a resin selected from the group consisting of polyether ether ketone, polyacetal, and polyamide.

18. The follower bearing according to claim 1, wherein the rolling element is a roller.

* * * * *